Jan. 4, 1955 W. MARGRAVE ET AL 2,698,632
CONTROL VALVE FOR SINGLE ACTING FLUID MOTORS
Filed April 26, 1949 2 Sheets-Sheet 1
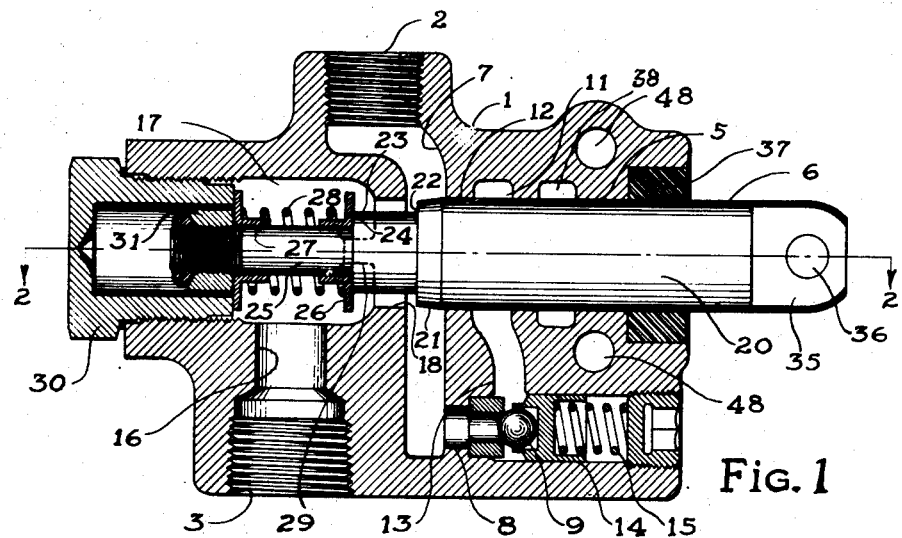
Fig. 1
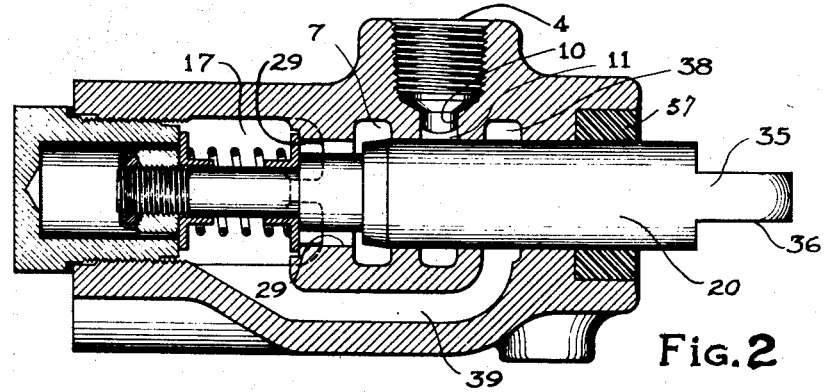
Fig. 2
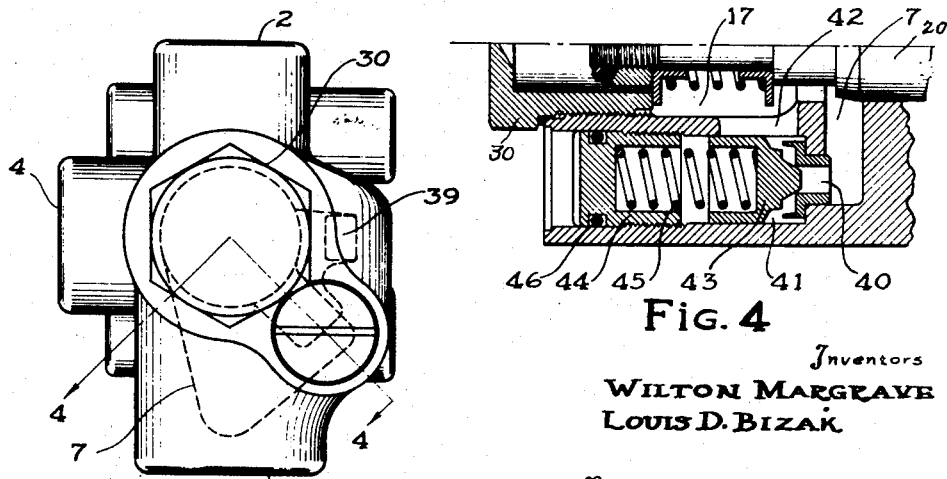
Fig. 3
Fig. 4
Inventors
WILTON MARGRAVE
LOUIS D. BIZAK
By Mason, Porter, Diller & Stewart
Attorneys Jan. 4, 1955   W. MARGRAVE ET AL   2,698,632
CONTROL VALVE FOR SINGLE ACTING FLUID MOTORS
Filed April 26, 1949   2 Sheets-Sheet 2

Inventors
WILTON MARGRAVE
LOUIS D. BIZAK
By Mason, Porter, Diller & Stewart
Attorneys

United States Patent Office 2,698,632
Patented Jan. 4, 1955

2,698,632

CONTROL VALVE FOR SINGLE ACTING FLUID MOTORS

Wilton Margrave, South Euclid, and Louis D. Bizak, Cleveland, Ohio, assignors to The Parker Appliance Company, Cleveland, Ohio, a corporation of Ohio Application April 26, 1949, Serial No. 89,778

12 Claims. (Cl. 137—620)

The present invention relates to spool or plunger type hydraulic valves for controlling single acting fluid motors of the reciprocating piston type.

In single acting motors of this type the piston is moved by fluid under pressure toward one end of the motor cylinder and is returned either by a spring or by gravity. Control valves for such motors are often referred to as three-way valves and direct fluid under pressure from a supply source to one side of the motor piston in one position of the valve and permit exhausting of this fluid under low pressure to a reservoir in another position of the valve. The first mentioned valve position is often referred to as the cylinder raise position and the other as the cylinder lower position. The valve may also have a third or neutral position for freely circulating the fluid at low pressure through the valve directly from the supply source to the reservoir. This is commonly known as an open center position and is provided for the purpose of permitting a continuous supply of fluid but to deliver it under high pressure only when desired. In certain instances however, this third position may be dispensed with.

The primary form of the present invention is intended for three-position control but with slight modification it may be adapted to two-position control. The valve has inlet, exhaust, and motor chambers selectively connectable through a valve bore. In the cylinder raise position the valve plunger closes the connection between the inlet chamber and the exhaust chamber and fluid under pressure passes from the inlet chamber to the cylinder chamber through a check valve controlled bypass passage. In the cylinder lower position the valve plunger connects both the inlet and cylinder chambers to the exhaust chamber to permit simultaneous return of the fluid from the fluid motor to the reservoir and the free circulation of the fluid from the supply source to the reservoir. A relief valve controlled bypass passage connects the inlet and exhaust chambers to prevent excessive pressures from being reached.

In the three-position form of the invention means is provided for automatically returning the plunger to the third or neutral position from either the cylinder raise or cylinder lower positions. In some installations it may be necessary or desirable to provide only cylinder raise and cylinder lower positions, in which case the means for automatically returning the plunger to a neutral position is replaced by either a means for automatically returning the valve from the cylinder raise to the cylinder lower positions or for retaining the valve in either of the two mentioned positions.

It is a primary object of the present invention to provide a valve which will perform the functions mentioned above and which will be extremely simple and compact in design. Toward this end a valve plunger is provided which has but a single land for blocking flow between the various port passages and but a single reduced portion on the plunger for permitting flow of fluid between selected passages.

It is another object to provide a valve of the type described in which the centering means for returning the valve to the neutral position is located within the exhaust passage so as to facilitate the obtaining of a compact design.

Another object of the invention is to provide a valve in which the plunger is balanced against high pressure fluid when the exhaust port is blocked off.

Another object of the invention is to provide a valve in which the plunger is balanced when subjected to high pressures but which is unbalanced when subjected to exhaust pressures, with such unbalance being in a direction tending to maintain the plunger in a position with the exhaust passage open.

Another object of the invention is to provide a valve in which an abutment shoulder is located in the exhaust passage, which shoulder is engageable by the centering means for the plunger and in which a bypass passage directs flow of fluid from one side to the other of the stop shoulder.

Another object of the invention is to provide a three-way valve in which a check valve controlled bypass passage connects the inlet chamber to the cylinder chamber for supplying fluid under pressure to the motor cylinder when the exhaust port is closed, and in which fluid returning from the motor cylinder passes through the bore containing the valve plunger to return to the exhaust chamber.

Other objects of the invention will be apparent from a more detailed description and by reference to the drawings, in which:

Fig. 1 is a vertical section through the three-position form of the valve and showing the plunger in the neutral or open center position.

Fig. 2 is a section taken along the lines 2—2 of Fig. 1.

Fig. 3 is an end view of Fig. 1.

Fig. 4 is a fragmentary section showing the pressure relief valve and taken along the lines 4—4 of Fig. 3.

Figure 5:
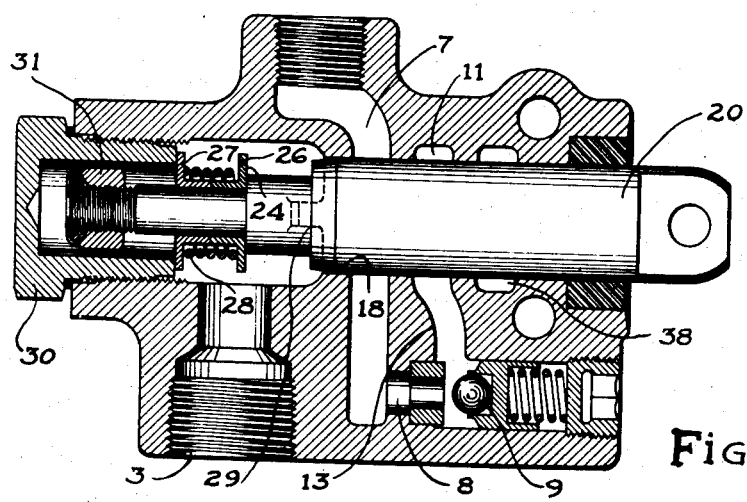
Fig. 5 is a sectional view corresponding to Fig. 1 but showing the valve in the cylinder raise position.

The valve comprises a casing 1 having an inlet port 2 adapted to be connected to the output side of a hydraulic pump, not shown. The casing also has an exhaust port 3 for connection to the reservoir (not shown) of the hydraulic circuit and a cylinder port 4 for connection to one end of a single acting cylinder or fluid motor. The casing also has a longitudinally extending bore 5 in which a valve plunger 6 is movably mounted.

The inlet port 2 communicates with an inlet passage or chamber 7 which intersects the bore 5 and which communicates with a bypass passage 8 in which a check valve 9 is mounted. The cylinder port 4 is connected by means of a passage 10 to a cylinder chamber 11 which intersects the bore 5 at a point spaced from the inlet passage 7 by a portion 12 of the valve bore 5. A passage 13 connects the inlet chamber 11 to the check valve controlled bypass passage 8. The check valve 9 includes a follower 14 and spring 15 and is so mounted as to permit flow from the inlet passage 7 to the cylinder chamber 11 but to prevent reverse flow. The exhaust port 3 is connected by means of a passage 16 to an exhaust chamber 17 which intersects or meets the valve bore 5 at a point spaced from the inlet chamber 7 by a portion 18 of the valve bore 5.

The valve plunger 6 has a single land 20 which is a close sliding fit within the bore 5 so as to block off flow of fluid between the inlet, exhaust and cylinder chambers through the valve bore 5 when the land 20 is opposite the bore portions 12 and 18 between such chambers.

Adjacent the inner end of the land 20 is a tapered portion 21 terminating in a transverse shoulder 22 and followed by a reduced cylindrical portion 23, another transverse shoulder 24 and another and further reduced cylindrical portion 25. Mounted on the latter is a centering means comprising collars 26 and 27 and spring 28 interposed therebetween. This centering means is contained within the exhaust chamber 17 and serves to automatically return the plunger to the neutral or central position from either of two end positions. In the central or neutral position as shown in Fig. 1 the collar 26 abuts the shoulder 24 on the plunger and also stop lugs 29 formed in the exhaust chamber 17. The collar 27 abuts the inner end of the bore closure cap 30 and is retained upon the reduced portion 25 of the plunger by the nut 31. Both collars 26 and 27 are slidable upon the reduced plunger portion 25. The exhaust chamber 17 is cored out intermediate the stop shoulder 29 as at 32 to maintain open communication between the ends of the exhaust chamber about the collar 26.

Adjacent the other end of the land 20 the plunger has a tongue 35 with a drilled hole 36 to which any suitable operating handle may be connected. A packing 37 seals the plunger against external leakage. Intermediate the packing 37 and the cylinder chamber 11 there is a relief chamber 38 surrounding the valve bore 5 and connected by means of a passage 39 to the exhaust chamber 17. This relief chamber serves to prevent leakage of fluid under high pressure to the packing 37 so that the packing will only be required to seal against low pressure.

An additional relief passage 40 connects the inlet passage 7 to the exhaust chamber 17 by means of a relief valve chamber 41 and a port 42, as shown in Fig. 4. A spring pressed relief valve 43 normally closes the passage 40. An adjusting screw 44 is threadably mounted within chamber 41 and engages the spring 45 for varying the settting of the relief valve 43. The adjusting screw is sealed by a packing 46.

Mounting holes 48 are provided in the casing to permit bolting of the valve to any suitable supporting structure when the valve is in use.

The valve as shown in Figs. 1 thru 6 has three positions for the valve plunger and operates in the following manner:

In the neutral or open center position as shown in Fig. 1, fluid from the pump enters through the inlet port 2 into the inlet chamber 7 and passes through the valve bore portion 18 past the reduced portions 23 and 25 of the valve plunger into the exhaust chamber 17 and out through the passage 16 and exhaust port 3 to the reservoir for the hydraulic circuit. Since the fluid is freely circulating from the output side of the pump through the valve and to the reservoir it will be under low or substantially no pressure. The fluid within the inlet chamber 7 acts on the underside of the check valve 9 but since it is under substantially no pressure the check valve will be held in its closed position by the spring 15. Meanwhile, the land 20 of the plunger blocks off communication between the cylinder chamber 11 and the inlet passage 7 at the bore portion 12. Since the check valve 9 prevents flow of fluid from the cylinder chamber back through the bypass passage 8, the fluid within the cylinder chamber 11 and hence within the single acting fluid motor to which the inlet chamber is connected will be trapped so as to prevent return of the fluid motor piston toward its retracted or cylinder lower position.

When it is desired to extend the fluid motor piston to the cylinder raise position, the valve plunger 6 is moved to the position shown in Fig. 5. In this position the land 20 moves opposite the bore portion 18 to block the flow of fluid from the inlet passage 7 to the exhaust chamber 17. This causes the pressure of the fluid within the inlet chamber 7 to build up to a high value to unseat the check valve 9 and pass through the cylinder chamber 11 and the port 4 to the fluid motor for moving the fluid motor piston to the cylinder raise position. In this position the collar 26 is moved away from the stop shoulder 29 toward the collar 27 by the shoulder 24 of the plunger so as to compress the centering spring 28. As soon as the operator releases the pressure which has been applied to move the plunger to the position shown in Fig. 5 the spring 28 operates to return it to the neutral position as shown in Fig. 1 with the collar 24 in engagement with the stop 29.

Figure 6:
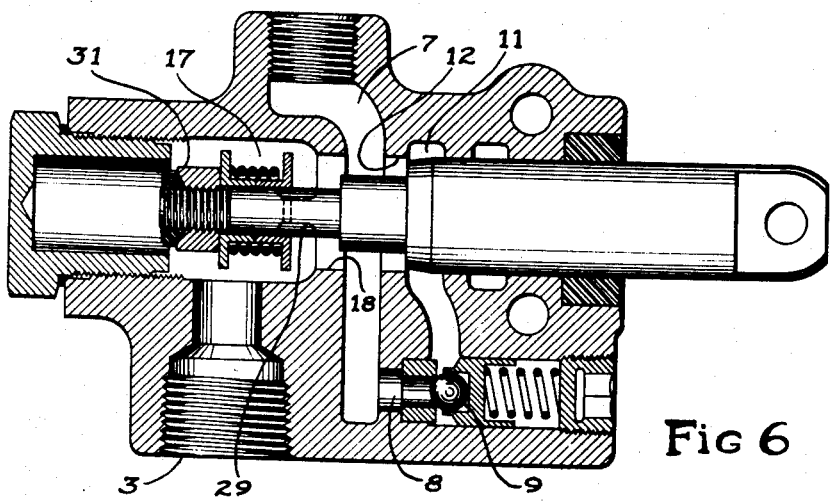
Fig. 6 is a sectional view corresponding to Fig. 1 but showing the valve in the cylinder lower position.

It will be noted that when the plunger 6 is in the cylinder raise position of Fig. 5, fluid is under high pressure only within the inlet and cylinder chambers 7 and 11 and the connecting passages 8 and 13 and does not operate endwise against or on any transverse face of the plunger 6. The chambers 7 and 11 completely surround the plunger and expose equal areas about the plunger periphery to high pressure fluid. Thus the plunger is completely balanced in both the axial and radial directions to the action of the high pressure fluid. When the valve plunger is moved to the cylinder lower position as shown in Fig. 6, the land 20 is withdrawn from the bore portion 18 and the tapered and reduced portions 21, 23, and 25 of the plunger permit the fluid to pass from the cylinder chamber 11 and the inlet chamber 7 thru the valve bore portions 12 and 18 to the exhaust port 3 to the circuit reservoir. Since in this position the inlet chamber 7 is connected to the exhaust chamber 17 the fluid will again be under substantially no pressure and the fluid motor piston, motivated either by the usual spring or by gravity, will cause the fluid to return from the motor back into the cylinder chamber 11, through the bore portions 12 and 18 and out through the exhaust chamber 17 and exhaust port 3 to the reservoir. In this position the plunger the nut 31 engages the collar 27 to move it away from the end of the cap 30 toward the collar 26 to compress the spring 28. When the operator again releases the pressure which has been applied to shift the plunger 6, the spring 28 will return the plunger to the neutral position as shown in Fig. 5.

When the plunger is in either of the neutral or cylinder lower positions as shown in Figs. 1 and 6 it will be apparent that the plunger is subjected to fluid pressure acting to move it in the righthand direction, as viewed in the drawing, across a transverse area equal to the diameter of the plunger land 20. However, in both of these positions the fluid within the valve is under low or substantially no pressure and therefor the total force imparted by the fluid to the exposed transverse area will be negligible. Whatever force is applied to the plunger across this area is applied in a direction to move the plunger toward the neutral and cylinder lower positions. At no time is the plunger subjected to any fluid pressure which would tend to move the plunger to the cylinder raise position. The obvious advantage of this is that there is no possibility for the valve to be accidently moved by fluid pressure to a position for operating the fluid motor.

When the valve plunger is in the cylinder raise position as shown in Fig. 5 and the fluid motor has been operated the desired amount it may be held in this position by returning the plunger to neutral as shown in Fig. 1. In this position the pressure fluid is bypassed from the inlet chamber 7 to the exhaust chamber 17, causing the pressure of the fluid to drop instantly. The check valve 9 will then close to prevent further delivery of fluid to the cylinder chamber 11. The plunger prevents escape of fluid from the cylinder chamber 11 past the valve bore portion 12 and therefore the fluid between the fluid motor and the cylinder chamber 11 will be trapped so as to prevent return movement of the fluid motor piston.

When the valve is in the neutral position of Fig. 1, and there is a force upon the piston of the fluid motor tending to return it, as for example when the fluid motor is used to do work against the force of gravity, the fluid within the fluid motor and the cylinder chamber 11 will be under a back pressure. In this event the check valve 9 is seated by such back pressure. If it is desired to extend the fluid motor piston an additional amount and the plunger is shifted to the position of Fig. 5 to close off the exhaust chamber in the manner indicated and permit the fluid in the inlet chamber 7 to build up, the check valve 9 will not be caused to open until the fluid pressure within chamber 7 has exceeded the pressure in the cylinder chamber 11. In other words, the check valve remains closed to hold the fluid motor piston in position even though the latter is under load tending to return it and will hold the fluid motor piston in its position after the valve plunger has been shifted to the cylinder raise position and until the pressure within the inlet chamber 7 has been built up a sufficient amount to open the check valve against back pressure from the motor. This prevents any momentary return motion of the fluid motor piston which would otherwise occur during the short interval between the shutting off of the exhaust port and the building up of pressure in the inlet chamber if the check valve would not be provided.

The relief valve 43 directly connects the inlet chamber 7 to the exhaust chamber 17 when the pressure in the inlet chamber exceeds a predetermined amount, this being a well known expedient for preventing unsafe pressure from being reached.

Figure 7:
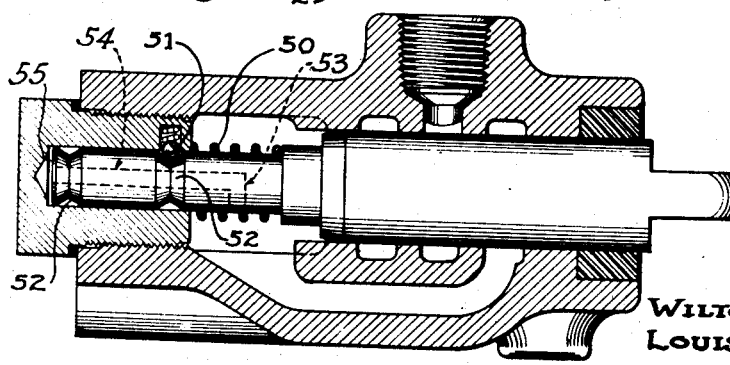
Fig. 7 is a fragmentary section showing an optional form of spring return when the valve is intended for two-position operation.

In some installations it is not desirable to provide a neutral position for the plunger but to only provide cylinder raise and cylinder lower positions. In this case the centering means comprising the spring 28, the collar 26 and 27 and the nut 31 may be dispensed with and a different spring 50 substituted, as shown in Fig. 7. In this case the spring 50 normally keeps the plunger in the cylinder lower position and the plunger may be shifted by the operator to the cylinder raise position (corresponding to Fig. 5) against the action of the spring 50. The spring 50 may be replaced by or combined with a suitable detent means 51 cooperating with detent grooves 52 in the plunger for holding the latter in any selected position. Drilled passages 53 and 54 in the plunger connect the chamber 55 with the exhaust chamber 17 to prevent trapping of fluid which would otherwise interfere with the free shifting of the plunger within the valve.

It will be noted that in all forms of the invention herein disclosed the plunger has but a single land 20 and a reduced portion at only one end of the land for providing a flow path through the valve bore 5 between the selected inlet, exhaust or cylinder chambers. Thus an extremely simple and compact plunger design is provided which greatly simplifies the manufacture thereof. Also, the centering spring 28 and the associated collars 26 and 27 are located within the exhaust chamber of the casing, therefore facilitating the making of a valve of minimum bulk.

It is obvious that many minor changes may be made in the detail arrangement of the parts without departing from the scope of the invention as defined in the following claims.

I claim:

1. In a valve, a casing having a bore and having cylinder inlet, and exhaust, chambers intersecting said bore in the order stated, said chambers being spaced from each other along the bore so as to provide bore portions between adjacent chambers, a plunger in said bore and movable in opposite directions from a neutral position to either of two operating positions, means associated with said plunger for selectively connecting said chambers through said bore portions when the plunger is moved to its different positions, said plunger having a reduced portion extending into the exhaust chamber in all positions of the plunger, centering means on said reduced portion and within said exhaust chamber and interposed between the body and plunger for returning said plunger to neutral position from either of the operating positions.

2. In a valve for controlling fluid flow, a casing having a bore and having an exhaust chamber and a cylinder chamber intersecting the bore at spaced points, an inlet chamber intersecting the bore between the exhaust and cylinder chambers, said chambers being spaced from each other along said bore to provide bore portions between adjacent chambers, a plunger in said bore having a cylindrical land and movable from a neutral position wherein the land blocks the bore portion between the inlet and cylinder chambers but not the bore portion between the inlet and exhaust chambers to an operating position wherein the plunger blocks all of the bore portions, a reduced portion on said plunger extending into said exhaust chamber, spring means on said reduced portion within said exhaust chamber and interposed between the casing and plunger for returning said plunger to neutral from said operating position, an abutment shoulder on the casing within said exhaust chamber, said spring means including an abutment member engageable with said abutment shoulder, and means for conducting exhaust fluid from one side to the other of said abutment member.

3. In a valve for controlling fluid flow, a casing having cylinder, a bore and having inlet, and exhaust chambers intersecting the bore at spaced points in the order stated, a plunger in said bore movable from a first position to a second position, means on said plunger for selectively connecting said chambers through the bore in the various plunger positions, a portion of said plunger extending into said exhaust chamber, an abutment shoulder on the casing intermediate the ends of the exhaust chamber, spring means on said plunger and interposed between the casing and plunger for returning the plunger to the first position from the second position and including an abutment member for engaging said abutment shoulder, and means for connecting the ends of said exhaust chamber across said abutment shoulder.

4. In a valve for controlling fluid flow, a casing having a bore and having cylinder, inlet and exhaust, chambers intersecting said bore in the order stated, a bypass passage connecting the inlet and cylinder chambers around said bore, a plunger movable in said bore and having means for connecting the inlet chamber to the exhaust chamber through said bore in one position of the plunger and for cutting off said connection in a different position of the plunger, an effective transverse area on said plunger located so as to be exposed to pressure of fluid within the inlet chamber when the plunger is in said one position whereby the fluid pressure in said inlet chamber exerts a force on said plunger tending to move the latter longitudinally in said bore, said effective area being also so located as to be cut off from exposure to the fluid in said inlet chamber when the plunger is in said different position.

5. In a valve, a casing having a bore and having cylinder, inlet, and exhaust chambers intersecting the bore at spaced points in the order stated, said chambers being spaced from each other along the bore so as to provide bore portions between adjacent chambers, a bypass passage connecting the inlet and cylinder chambers around said bore, a plunger in the bore, said plunger having a cylindrical land closely fitting the bore and being movable within the bore from a neutral position wherein the land blocks the bore portion between the inlet and cylinder chambers but not the bore portion between the inlet and the exhaust chambers to an operating position wherein the plunger blocks all of the bore portions, a reduced portion on said plunger extending into said exhaust chamber, a spring on said reduced portion within the exhaust chamber and interposed between the casing and the plunger for returning the latter to neutral from said operating position.

6. In a valve, a casing having a bore and having cylinder, inlet, and exhaust chambers intersecting and completely surrounding said bore in the order stated, said chambers being spaced from each other along the bore so as to provide bore portions between adjacent chambers, a bypass passage connecting the inlet and cylinder chambers around said bore, a solid plunger movable in the bore, said plunger having a single cylindrical land with a reduced portion adjacent one end of the land, said plunger being moveable from a neutral position wherein the land blocks the bore portions between the inlet and cylinder chambers and the reduced portion permits communication between the inlet and exhaust chambers to a first operating position in which the single land blocks all of the bore portions, and moveable to another operating position in which the cylindrical land is withdrawn from all of said bore portions and the reduced portion permits the simultaneous communication of all said chambers through the bore.

7. In a valve, a casing having a bore and having exhaust, inlet, and cylinder chambers intersecting the bore in that order, said chambers being spaced from each other along the bore so as to provide bore portions between adjacent chambers, a solid plunger in the bore, said plunger having a single cylindrical land closely fitting the bore and being moveable within the bore to a neutral position wherein the land will block the bore portion between the inlet chamber and cylinder chamber but will not block communication of the inlet chamber with the exhaust chamber through the bore whereby fluid in the inlet chamber will be discharged through the exhaust chamber at relatively low pressure, a bypass passage connecting the inlet chamber with the cylinder chamber around the bore, said plunger being placeable in another position within the bore where the land will block the bore portions between all of the chambers whereby fluid in the inlet chamber will pass at relatively high pressure to the cylinder chamber through the bypass passage, a check valve in the bypass passage permitting flow of fluid only from the inlet chamber to the cylinder chamber, a spring normally urging the check valve to closed position, said spring being of a strength sufficient to seat the check valve against the low pressure occurring when the inlet chamber is connected to the exhaust chamber but not sufficient to seat the check valve against the high pressure occurring when the land blocks all of said bore portions.

8. In a valve, a casing having a bore and having a first exhaust, inlet, cylinder, and a second exhaust chamber intersecting and completely surrounding said bore in that order, said chambers being spaced from each other along the bore so as to provide bore portions between adjacent chambers, a bypass passage connecting the inlet and cylinder chambers around said bore and a second bypass passage connecting the two exhaust chambers around said bore, a check valve in the first mentioned bypass passage permitting flow of fluid only from the inlet chamber to the cylinder chamber, a solid plunger moveable in the bore, said plunger having a single cylindrical land and a reduced portion adjacent one end of the land, said plunger being moveable from a neutral position wherein the single land blocks the bore portions between the inlet and cylinder chambers and between the cylinder and second exhaust chambers and wherein the reduced portion permits communication between the inlet and first exhaust chambers to a first operating position wherein the single land blocks the bore portions between all of the chambers, said plunger also being moveable to a second operating position wherein the single land simultaneously connects the first exhaust, inlet and cylinder chambers.

9. In a valve, a casing having a bore and having a first exhaust, inlet, cylinder, and a second exhaust chamber intersecting and completely surrounding said bore in that order, said chambers being spaced from each other along the bore so as to provide bore portions between adjacent chambers, a bypass passage connecting the inlet and cylinder chambers around said bore and a second bypass passage connecting the two exhaust chambers around said bore, a check valve in the first mentioned bypass passage permitting flow of fluid only from the inlet chamber to the cylinder chamber, a solid plunger moveable in the bore, said plunger having a single cylindrical land and a reduced portion adjacent one end of the land, said plunger being moveable from a neutral position wherein the single land blocks the bore portions between the inlet and cylinder chambers and between the cylinder and the second exhaust chambers and wherein the reduced portion permits communication between the inlet and first exhaust chambers to a first operating position wherein the single land blocks the bore portions between all of the chambers, said plunger also being moveable to a second operating position wherein the single land simultaneously connects the first exhaust, inlet and cylinder chambers, said reduced portion of the plunger extending into the first exhaust chamber, and means including a spring mounted on said reduced portion and interposed between the casing and plunger for returning the plunger to neutral position from either of the operating positions.

10. In a valve, a casing having a bore and having cylinder, inlet, and exhaust chambers intersecting said bore in the order stated and completely surrounding said bore at spaced points so as to provide bore portions between adjacent chambers, a plunger slidable in said bore and having a single land closely fitted therein, said plunger having a reduced portion adjacent said land and placeable for simultaneously establishing communication between said inlet, exhaust, and cylinder chambers through said bore and past said reduced portion, said plunger being placeable in another position whereby the single land is within the bore portion between the inlet and exhaust chambers for cutting off communication therebetween.

11. In a valve, a casing having a bore and having cylinder, inlet, and exhaust chambers intersecting said bore in the order stated and completely surrounding said bore at spaced points so as to provide bore portions between adjacent chambers, a plunger slidable in said bore and having a single land closely fitted therein, said plunger having a reduced portion adjacent said land and placeable for simultaneously establishing communication between said inlet, exhaust, and cylinder chambers through said bore and past said reduced portion, said plunger being placeable in another position whereby the single land is within the bore portion between the inlet and exhaust chambers for cutting off communication therebetween, said plunger also being placeable in a third position whereby the single land is within the bore portion between the inlet and cylinder chambers and the reduced portion is within the bore portion between the inlet and exhaust chambers to establish communication therebetween.

12. In a valve, a casing having a bore and having cylinder, inlet, and exhaust chambers intersecting said bore in the order stated and completely surrounding said bore at spaced points so as to provide bore portions between adjacent chambers, a plunger slidable in said bore and having a single land closely fitted therein, said plunger having a reduced portion adjacent said land and placeable for simultaneously establishing communication between said inlet, exhaust, and cylinder chambers through said bore and past said reduced portion, said plunger being placeable in another position whereby the single land is within the bore portion between the inlet and exhaust chambers for cutting off communication therebetween, said plunger also being placeable in a third position whereby the single land is within the bore portion between the inlet and cylinder chambers and the reduced portion is within the bore portion between the inlet and exhaust chambers to establish communication therebetween, and a bypass passage connecting the inlet and cylinder chambers around said bore, and a check valve in said bypass passage permitting flow therethrough only in the direction of the cylinder chamber.

References Cited in the file of this patent
UNITED STATES PATENTS

| Number | Name | Date |
|---|---|---|
| 461,981 | Miles | Oct. 27, 1891 |
| 521,008 | Beach | June 5, 1894 |
| 2,152,084 | Paine | Mar. 28, 1939 |
| 2,312,686 | Campbell | Mar. 2, 1943 |
| 2,392,422 | Stephens | Jan. 8, 1946 |
| 2,483,907 | Ifield | Oct. 4, 1949 |